United States Patent
Takahashi et al.

(10) Patent No.: US 6,217,969 B1
(45) Date of Patent: Apr. 17, 2001

(54) SPUTTERING TARGET DISK

(75) Inventors: Yoshitomo Takahashi, Fujisawa; Hiroaki Wada, Kawasaki; Akira Satou, Iruma, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/137,749

(22) Filed: Aug. 21, 1998

(30) Foreign Application Priority Data

Aug. 27, 1997 (JP) .................................................. 9-231572

(51) Int. Cl.$^7$ .................................................. C04B 35/565
(52) U.S. Cl. ..................... 428/64.1; 501/90; 204/192.15; 204/192.23; 204/192.26; 264/65; 428/446; 428/698
(58) Field of Search .................................. 428/64.1, 446, 428/698; 204/192.23, 192.15, 192.26; 264/65; 501/901

(56) References Cited

U.S. PATENT DOCUMENTS 4,525,461 * 6/1985 Boecker .................................. 501/90
5,944,963 * 8/1999 Ruppel ............................ 204/192.23

FOREIGN PATENT DOCUMENTS

| 4-128369 | 4/1992 | (JP) . |
| 6-49632 | 2/1994 | (JP) . |
| 6-220624 | 8/1994 | (JP) . |

* cited by examiner

Primary Examiner—Nasser Ahmad
(74) Attorney, Agent, or Firm—Oliff & Berridge, PLC

(57) ABSTRACT

A sputtering target disk is provided which is comprised of a sintered silicon carbide having a density of 2.9 g/cm$^3$ or more and obtained by sintering a uniform mixture of a powder of silicon carbide and a nonmetallic auxiliary sintering agent. The sputtering target disk is advantageously used in a sputtering treatment to form thin films with high purity which are suitable for use in various parts of electronic devices. The sputtering target disk exhibits excellent mechanical properties, electric properties, and durability against uneven wear.

7 Claims, No Drawings

SPUTTERING TARGET DISK

BACKGROUND OF THE INVENTION

1. Field of the Invention

The present invention relates to a sputtering target disk which is made of silicon carbide and which is advantageously used for a sputtering treatment for forming thin films, which are useful as protective films and functional films in various parts of electronic devices, and thin films, which are useful for a surface treatment of various jigs and tools to improve durability.

2. Description of the Related Art

Recently, several types of thin films formed on substrate materials have been utilized in various fields, such as the electro-mechanical industry. These films exhibit various functions, such as magnetism, insulation, and dielectric property, and have various mechanical properties, such as high strength and high hardness, and various chemical properties, such as corrosion resistance.

The processes for forming such thin films are mainly classified into the following two processes: (i) the process of chemical vapor phase deposition (CVD process) in which gases of various materials are introduced into a nonoxidizing atmosphere, and a film is formed by deposition which accompanies the reaction; and (ii) the process of physical vapor phase deposition (sputtering process, or PVD process) in which a material for a film is used as a target, and ions are made to collide against a film of the material on a substrate disposed at a position opposing the target. There are two types of sputtering processes, a direct current sputtering process and a high frequency sputtering process. The sputtering process is much more advantageous than the CVD process because the sputtering process is superior from the standpoint of production cost and mass production and is less dependent on the substrate material.

The material of silicon carbide used herein exhibits the best heat resistance, heat conductivity, surface hardness, and corrosion resistance among various ceramic materials. Products having a thin film of this material formed on a substrate have been used very advantageously in parts of various electronic devices, in various jigs and tools for assembly of parts, and in molds. Particularly in parts of electronic devices, the above material is used for protective films of peripheral instruments of computers, such as heads and disk plates of hard disks and optical magnetic disks, by taking advantage of the high hardness and the excellent sliding property of the material. The material is also used for separation membranes in functional devices by taking advantage of its high heat conductivity.

It is most preferable that the silicon carbide thin film is formed in accordance with the sputtering process as described above, but a high performance sputtering target disk made of silicon carbide is required for the process.

The conventional target disk used for forming a thin film is a sintered material prepared by adding alumina or boron as the auxiliary sintering agent or is a porous sintered material prepared without adding an auxiliary sintering agent because a high density sintered material can be obtained from powder of silicon carbide. However, when an auxiliary sintering agent containing a metal, such as alumina, is added, there occurs the problem that the auxiliary sintering agent becomes impurities in the sintered material, and thus the product is not suitable for application in the electronic field. The porous sintered material has problems in that ion sputter tends to become uneven during the sputtering, and this causes uneven wear of the porous sintered material which in turn decreases its life, and in that free particles are formed by cleavage of particles forming the target, and in that cracks tend to be formed in the target when the target is attached to a packing plate because of low mechanical strengths and low impact resistance under heating, such that the target may break during attachment thereof to an apparatus.

Under the above circumstances, there is the need to provide a target disk of silicon carbide having a higher density and a smaller content of impurities. To satisfy this need, processes for obtaining a high density sintered material without using conventional metallic auxiliary sintering agents have been proposed. Examples of such processes include 1) a process in which fine powder is formed in accordance with the process of vapor phase growth (the CVD process), and a sintered material is prepared from the formed powder without using an auxiliary sintering agent, and 2) a process in which a product having a plate shape is directly prepared by the process of vapor phase growth (the CVD process). In these processes, gases or solutions containing silicon and carbon are used as the raw materials.

However, these processes also have a drawback in that productivity is very poor, and the cost of production is high. Moreover, process 1) has a drawback in that the powder is too fine, and particles tend to be formed even when the product after sintering is used in parts of electronic devices. Process 2) has a drawback in that it is difficult to prepare a molded product having a large thickness, and it is difficult to obtain an electric conductivity suitable for the direct current sputtering.

SUMMARY OF THE INVENTION

An object of the present invention is to provide a sputtering target disk comprised of silicon carbide which is advantageously used for a sputtering treatment to form thin films having a high purity useful as protective films and functional films in various parts of electronic devices, and thin films suitable for use in the surface treatment of various jigs and tools to improve durability. The disk according to the present invention exhibits excellent mechanical properties, electric properties, and durability against uneven wear.

The present inventors found that when a sintered silicon carbide obtained in accordance with a specific process is used for the sputtering target disk, the disk can exhibit the very excellent properties.

Accordingly, the sputtering target disk of the present invention is comprised of a sintered silicon carbide which has a density of 2.9 g/cm$^3$ or more and which is obtained by sintering a uniform mixture of a powdered silicon carbide and a nonmetallic auxiliary sintering agent.

The nonmetallic auxiliary sintering agent is preferably an organic compound which generates carbon in the presence of heat. The nonmetallic auxiliary sintering agent may be present in such a condition that the agent covers the surface of the powdered silicon carbide during sintering.

The sintered silicon carbide may be obtained by hot pressing the above mixture in a nonoxidizing atmosphere.

The total amount of impurity elements contained in the sintered silicon carbide is preferably 1 ppm or less.

The powder of silicon carbide is obtained in accordance with a process comprising a solidifying step which comprises solidifying a mixture obtained by mixing a silicon source containing at least one liquid silicon compound, at least one liquid organic compound which generates carbon in the presence of heat, and a polymerization or crosslinking catalyst to obtain a solid material; and a sintering step which comprises carbonizing the resulting solid material in a nonoxidizing atmosphere by heating, followed by sintering the carbonized material in a nonoxidizing atmosphere. In accordance with this process, a high purity sintered material having a total content of impurities of 1 ppm or less can be obtained.

In accordance with the present invention, the sintered material has a high purity, contains little foreign substance at the crystal boundaries, and shows excellent heat conductivity, since metallic auxiliary sintering agents such as boron, aluminum, beryllium or compounds of these metals, or carbon auxiliary sintering agents such as carbon black and graphite are not used as the auxiliary sintering agent, and a nonmetallic auxiliary sintering agent alone is used. The sintered material of the present invention exhibits more excellent characteristics of silicon carbide such as resistance to contamination and wear resistance. A sputtering target disk comprised of the sintered material of the present invention which can form this films suitable as protective films and functional films of various parts of electronic devices and can form thin films useful for surface treatment of various jigs and tools to improve durability, is provided.

DESCRIPTION OF THE PREFERRED EMBODIMENTS

The present invention is described more specifically hereinafter.

The powder of silicon carbide which is used as the raw material of the sputtering target disk of silicon carbide of the present invention may be α-type silicon carbide, β-type silicon carbide, amorphous silicon carbide, or silicon carbide which is a mixture of these types. A powder of β-type silicon carbide is preferably used. The grade of the powder of β-type silicon carbide is not particularly limited, and for example, a commercially available powder of β-type silicon carbide can be used. It is preferable that the powder of silicon carbide has a smaller particle diameter in order to obtain a sintered silicon carbide with high density. The particle diameter is preferably about 0.01 to 5 μm, and more preferably about 0.05 to 3 μm. When the particle diameter is 0.01 μm or more, the powder facilitates handling in the stages of measuring and mixing, and when the particle diameter is 5 μm or less, the powder has a surface area which facilitates obtaining a sintered silicon carbide having a high density. In other words, particles of a powder having a diameter of 5 mm or less have a suitable contact surface area between the particles.

A powder of silicon carbide having a particle diameter of 0.05 to 1 μm, a specific surface area of 5 m²/g or more, a content of free carbon of 1% or less, and a content of oxygen of 1% or less is preferably used. The distribution of the particle size of the powder of silicon carbide which is used is not particularly limited. The distribution of the particle size may have two peaks from the standpoint of increasing the packing density of particles and the reactivity of silicon carbide during the preparation of the sintered silicon carbide.

It is preferable that the sintered silicon carbide used for the sputtering target disk has a high purity. To obtain a sintered silicon carbide having a high purity, a powder of silicon carbide having a high purity can be used as the raw material.

The powder of silicon carbide having a high purity can be obtained, for example, in accordance with a process comprising a solidifying step which comprises solidifying a mixture obtained by uniformly mixing a silicon source containing at least one liquid silicon compound, at least one liquid organic compound which generates carbon in the presence of heat, and a polymerization or crosslinking catalyst to obtain a solid material; and a sintering step which comprises carbonizing the resulting solid material in a nonoxidizing atmosphere by heating, followed by sintering the carbonized material in a nonoxidizing atmosphere.

The silicon compound used for producing the powder of silicon carbide having a high purity (occasionally referred to hereinafter as the silicon source) may be combinations of liquid silicon compounds and solid silicon compounds. However, at least one compound selected from liquid silicon compounds should be included. A mono-, di-, tri-, or tetraalkoxysilane, or a polymer of a tetraalkoxysilane can be used as the liquid silicon compound. Among these alkoxysilanes, tetraalkoxysilanes are preferable. Specific examples of the tetraalkoxysilane include tetramethoxysilane, tetraethoxysilane, tetrapropoxysilane, and tetrabutoxysilane. Tetraethoxysilane is more preferable from the standpoint of handling. Examples of the polymer of a tetraalkoxysilane include polymers of silicic acid having a low degree of polymerization of about 2 to 15 (oligomers) and liquid polymers of silicic acid having a higher degree of polymerization. Examples of the solid silicon compound which is used in combination with the liquid silicon compound include silicon oxides. In the present invention, the silicon oxide include, in addition to SiO, silica sol (such as fluids containing extremely fine colloidal silica which contains hydroxyl group and alkoxy groups inside the particles) and silicon dioxide (such as silica gel, fine silica, and powder of quartz).

Oligomers of tetraethoxysilane and mixtures of an oligomer of tetraethoxysilane and a fine powder of silica are preferable from the standpoint of better uniformity and handling. Substances having a high purity are used as the silicon source. The original content of impurities in the silicon source is preferably 20 ppm or less, and more preferably 5 ppm or less.

The organic compound which generates carbon in the presence of heat which is used in the process for producing the powder of silicon carbide may be a liquid compound or a combination of a liquid compound and a solid compound. The organic compounds may be used to provide a, large amount of residual carbon, and are polymerized or crosslinked in the presence of a catalyst or heating. Examples of the organic compound are monomers, prepolymers and polymers of resins such as phenol resins, furan resins, polyimides, polyurethanes, and polyvinyl alcohol as well as liquid materials such as cellulose, cane sugar, pitch, tar and the like. Among these organic compounds, phenol resins of the resol type are particularly preferable. The purity of the organic compound can suitably be controlled or selected in accordance with the purpose. When a powder of silicon carbide having a particularly high purity is required, it is preferable that an organic compound which does not contain 5 ppm or more of any metal is used.

In the production of the powder of silicon carbide which is used as the material powder in the present invention, the ratio of carbon to silicon (abbreviated hereinafter as C/Si ratio) is defined in accordance with the result of elemental analysis of an intermediate product obtained by carbonization of the mixture. From the stoichiometry of the reaction, the content of free carbon in the formed silicon carbide should be 0% when the C/Si ratio is 3.0. However, in actuality, free carbon is formed at a lower C/Si ratio because SiO gas formed simultaneously during the reaction is removed. It is important that the formulation is decided in advance so that free carbon is not formed in the powdered silicon carbide in an amount which adversely affects the use of the sintered material. In general, the formation of free carbon can be suppressed in baking at 1600° C. or higher at a pressure of about 1 atm when the C/Si ratio is 2.0 to 2.5. When the C/Si ratio is 2.5 or more, the amount of free carbon markedly increases. Alternatively, a C/Si ratio of 2.5 or more may suitably be used depending on the purpose of forming particles because free carbon shows an effect of suppressing growth of grains. When the pressure of the atmosphere in the baking is higher or lower, a different value of the C/Si ratio may be suitable for obtaining a silicon carbide having a high purity. Therefore, the C/Si ratio is not necessarily limited to the above range in this case.

The effect of the free carbon obtained during the sintering step is much smaller than the effect of the carbon derived from the nonmetallic auxiliary sintering agent which is used in the present invention and covers the entire surface of the powder of silicon carbide. Therefore, the effect of the free carbon is essentially negligible.

In the present invention, if necessary, the mixture of the silicon source and the organic compound which generates carbon in the presence of heat may be hardened into a solid to obtain a solid material in which the silicon source and the organic compound are uniformly mixed together. Examples of the method of hardening include crosslinking by heating, hardening in the presence of a hardening catalyst, and methods using electronic beams or irradiation. The hardening catalyst can be suitably selected in accordance with the carbon source. When a phenol resin or a furan resin is used as the carbon source, acids such as toluenesulfonic acid, toluenecarboxylic acid, acetic acid, oxalic acid, hydrochloric acid, and sulfuric acid, and amines such as hexamine can be used.

The carbonization of the solid material of the mixture of the raw materials is conducted by heating the solid material in a nonoxidizing atmosphere, such as an atmosphere of nitrogen or argon, at 800 to 1,000° C. for 30 to 120 minutes.

Silicon carbide is formed by heating the resulting carbonized product in a nonoxidizing atmosphere, such as an atmosphere of argon, at 1,350° C. or higher and 2,000° C. or lower. The temperature and the time of the baking can suitably be selected in accordance with the desired property of the sintered material, such as the particle diameter. Baking at 1,600 to 1,900° C. is preferable to achieve effective formation of silicon carbide.

When a powder having a still higher purity is required, iimpurities can be further removed by a further heat treatment at 2,000 to 2,100° C. for 5 to 20 minutes during the above baking.

As the process for producing a powder of silicon carbide having a particularly high purity, there can be used the process for producing a material powder described in U.S. patent application Ser. No. 08/534,847 (the disclosure of which is incorporated herein by reference) which was filed with Japanese Patent Office by the same assignee as the present application. This process comprises a step of forming a powder of silicon carbide and a post-treatment step. In the step of forming the powder of silicon carbide, a silicon source and a carbon source are uniformly mixed to prepare a mixture, and the mixture is baked by heating in a non-oxdizing atmosphere to obtain a powder of silicon carbide. The silicon source is at least one compound selected from high-purity tetraalkoxysilanes, high-purity polymers of tetraalkoxysilanes, and high-purity silicon oxide, and the carbon source is a high-purity organic compound which generates carbon in the presence of heat. In the post-treatment step, the powder of silicon carbide is maintained at a temperature of 1,700° C. or higher and lower than 2,000° C. and, while the temperature is essentially maintained in this range, the powder is treated by heating at 2,000° C. to 2,100° C. for 5 to 20 minutes at least once. A high purity powder of silicon carbide containing 0.5 ppm or less of each impurity can be obtained in accordance with this process comprising the above two steps.

In the production of the sintered silicon carbide suitably used for the sputtering target disk of the present invention, a substance which generates carbon in the presence of heat, i.e., a so-called carbon source, is used as the nonmetallic auxiliary sintering agent, and this substance is mixed with the above powder of silicon carbide. Examples of the above substance include organic compounds which generate carbon in the presence of heat and powders of silicon carbide covered with these organic compounds on the surface thereof (particle diameter: about 0.01 to 1 $\mu$m). Among these substances, the former is preferable from the standpoint of the effects achieved.

In the present invention, the substance used as the carbon source is added as the nonmetallic auxiliary sintering agent in place of a conventional auxiliary sintering agent and functions to accelerate the reaction. Specific examples of the substance include coal tar pitch containing a large amount of residual carbon, phenol resins, furan resins, epoxy resins, phenoxy resins, and various types of sugar, such as mono-succharides such as glucose, oligosuccharides such as sucrose, and polysuccharides such as cellulose and starch. Among these substances, substances which are liquid at room temperature, substances which are soluble into a solvent, or substances which are softened or turned into a liquid, for example thermoplastic or hot melt in the presence of heat, are preferable for achieving uniform mixing with the powder of silicon carbide. Phenol resins, particularly phenol resins of the resol type, are more preferable because of the high strengths of molded products.

The above organic compound functions as the auxiliary sintering agent effectively, since inorganic carbon compounds such as carbon black and graphite are formed at or in the vicinity of the surface of silicon carbide in the presence of heat, and the oxide layer covered on the surface is efficiently removed during the sintering. The advantageous effect obtained by addition of the above nonmetallic auxiliary sintering agent of the present invention cannot be achieved when a conventional substance heretofore used as an auxiliary sintering agent such as carbon black and graphite is used.

In the present invention, it is preferable that the nonmetallic auxiliary sintering agent is dissolved or dispersed in a solvent; and the prepared solution or dispersion is used to prepare the mixture of the powder of silicon carbide and the nonmetallic auxiliary sintering agent. The solvent is suitably selected in accordance with the compound used as the nonmetallic auxiliary sintering agent. Specifically, a lower alcohol such as ethyl alcohol, ethers, or acetone can be used for a phenol resin which is preferable as the organic compound which generates carbon in the presence of heat. It is also preferable that the used nonmetallic auxiliary sinterig agent and the used solvent have small contents of impurities.

A considerably small amount of the nonmetallic auxiliary sintering agent used as a mixture with the powder of silicon carbide leads to a low density of the sintered material. On the other hand, a considerably large amount tends to inhibit an increase in the density because of the increase in free carbon contained in the sintered material. The amount of the nonmetallic auxiliary sintering agent is generally 10% by weight or less, preferably 2 to 5% by weight, although the amount differs in accordance with the type of the nonmetallic auxiliary sintering agent. This amount can be decided by determining the amount of silica (silicon oxide) at the surface of the powder of silicon carbide by using hydrofluoric acid, followed by stoichiometrically calculating the amount sufficient to reduce the silica.

The silica of the amount determined above is reduced, according to the following chemical reaction, with carbon derived from the nonmetallic auxiliary sintering agent. The amount of addition of carbon described herein is determined by taking into consideration the residual carbon ratio (the percentage of the nonmetallic auxiliary sintering agent converted into carbon) after thermal decomposition of the nonmetallic auxiliary sintering agent.

$$SiO_2 + 3C \rightarrow SiC + 2CO$$

In the sintered silicon carbide relating to the present invention, it is preferable that the total content of carbon atoms derived from silicon carbide contained in the sintered silicon carbide and carbon atoms derived from the nonmetallic auxiliary sintering agent exceeds 30% by weight and is less than or equal to 40% by weight. When the total content is 30% by weight or less, relative amounts of impurities contained in the sintered material increase. When the total content exceeds 40% by weight, the density of the sintered material decreases, and thus properties such as strengths and oxidation resistance of the sintered material deteriorate due to the excessively large content of carbon.

In the production of the sintered material of silicon carbide of the present invention, the powder of silicon carbide and the nonmetallic auxiliary sintering agent are uniformly mixed together. As described above, a phenol resin used as the nonmetallic auxiliary sintering agent is dissolved into a solvent, such as ethyl alcohol, and then mixed with the powder of silicon carbide sufficiently. The mixing can be conducted by a conventional method, such as a method using a mixer or a planetary ball mill. The miing is conducted preferably for 10 to 30 hours, more preferably for 16 to 24 hours. After sufficient mixing has been achieved, the solvent is removed at a temperature suitable for the solvent, for example at 50 to 60° C. when ethyl alcohol is used as described above, until the mixture is dried, and the resulting mixture is sieved by a sieve to obtain a powder of the mixture which is used as a raw material powder. From the standpoint of achieving a high purity, the container and the balls of the ball mill may be made of a synthetic resin which does not contain metals. A granulating machine, such as a spray drier, may be used for drying.

In the step of sintering which is the essential step in the process for producing the sputtering target disk of the present invention, the mixture of the powder or a molded product made of the mixture of the powder obtained in the molding step described below is placed in a mold and hot pressed at a temperature of 2,000 to 2,400° C. at a pressure of 300 to 700 kgf/cm² in a nonoxidizing atmosphere.

As for the mold used in this step, it is preferable from the standpoint of the purity of the sintered material that a portion of the mold or the entire mold is made of a material such as graphite or that Teflon sheets are placed inside the mold so that the molded product and metallic portions of the mold do not directly contact each other.

In the present invention, the pressure of the hot pressing can be in the range of 300 to 700 kgf/cm². Particularly at pressures of 400 kgf/cm² or more, parts used for the hot pressing such as dies and punches, may be parts having good pressure resistance.

The sintering step will be described more specifically hereinafter. It is preferable that, before the hot pressing step is conducted to prepare the sintered material, impurities are sufficiently removed by heating under the following conditions and complete carbonization of the carbon source is achieved, and that hot pressing is then carried out thereafter under the above-described conditions.

It is preferable that the sintering step is conducted by two-step heating as follows. In the first step, a furnace is evacuated and slowly heated from room temperature to 700° C. When it is difficult to control the temperature in the furnace, the temperature may be increased continuously to 700° C. in a single step. However, it is preferable that, after the pressure in the furnace is adjusted to $10^{-4}$ Torr, the temperature is slowly increased from room temperature to 200° C., maintained at this temperature, then increased slowly to 700° C., and maintained at about 700° C. In this first step, absorbed water evaporates and bonding agents are decomposed, and carbonization proceeds through the thermal decomposition of the carbon source. The period of time over which the temperature is maintained at about 200° C. or 700° C. is selected to be a suitable range which depends on the type of bonding agents and the size of the sintered material. The sufficient period of time can be determined on the basis of whether the slightly increased pressure returns to the predetermined pressure (for example $10^{-4}$ Torr) or not. If the temperature is raised before the sufficient period of the time has elapsed, removal of impurities and carbonization of the carbon source do not proceed sufficiently, and thus there is the possibility that cracks and pores are formed in the molded product.

For example, the following procedures are carried out for a sample of 5 to 10 g. After the pressure is adjusted to $10^{-4}$ Torr, the temperature is slowly increased from room temperature to 200° C., maintained at this temperature for about 30 minutes, and then slowly continued to be raised until the temperature reaches 700° C. The period of time required to raise the temperature from room temperature to 700° C. is about 6 to 10 hours, preferably about 8 hours. It is preferable that the temperature is maintained at about 700° C. for 2 to 5 hours.

The temperature is further raised from 700° C. to 1,500° C. in vacuo for 6 to 9 hours, for the same sample as described above. The temperature is maintained at 1,500° C. for about 1 to 5 hours. It is believed that silicon dioxide and silicon oxide are reduced in this step. To completely remove the oxygen bonded to the silicon, it is important that this reduction reaction be allowed to proceed completely. Therefore, it is important that the temperature be maintained at 1,500° C. for a period of time sufficient to completely generate carbon monoxide which is formed as a byproduct of the reduction reaction. In other words, the temperature may be maintained at 1,500° C. until the decrease in the vacuum becomes small and a state of slightly increased pressure is not observed, or the pressure value returns to the value observed before the start of the reduction, i.e., the value at the time when the temperature was about 1,300° C. By the reduction through heating in the second step, the silicon dioxide, which is attached to the surface of the powdered silicon carbide and which adversely affects the increasing of the density and which causes formation of larger particles, can be removed. The gas containing SiO and/or CO, which is generated in the reduction step, contains impurity elements. This gas is continuously discharged and removed from the reaction furnace by a vacuum pump. Therefore, preferably, the temperature is sufficiently maintained at the above value from the standpoint of producing a sintered material with a high purity.

It is preferable that the hot pressing is conducted at a high pressure after the above steps of heating have been completed. When the temperature is raised above 1,500° C., the sintering starts. At this time, the pressure is increased up to about 300 to 700 kgf/cm² to suppress abnormal growth of particles. Subsequently, an inert gas is introduced into the furnace to achieve a nonoxidizing atmosphere. Nitrogen or argon gas can be used as the inert gas, and argon gas is preferable because argon gas is inert even at high temperatures.

After the atmosphere inside the furnace has been converted into a nonoxidizing atmosphere, the temperature is raised to 2,000 to 2,400° C. and the pressure is increased to 300 to 700 kgf/cm². The pressure for the hot pressing can be selected in accordance with the particle diameter of the material powder. When the diameter of the material powder is smaller, an excellent sintered material can be obtained at a relatively smaller pressure for the hot pressing. The heating from 1,500° C. to the maximum temperature of 2,000 to 2,400° C. is carried out over 2 to 4 hours. The sintering reaction is accelerated at 1,850 to 1900° C. The temperature is maintained at the maximum temperature for 1 to 3 hours, and then the sintering is completed.

A maximum temperature lower than 2,000° C. does not lead to the production of a sintered material with sufficient density. When the maximum temperature exceeds 2,400° C., there is the possibility that the raw material used for the molding sublimes or decomposes. Therefore, such maximum temperatures are not preferable. A pressure lower than 500 kgf/cm² also does not lead to the production of a sintered material with sufficient density. On the other hand, when the pressure exceeds 700 kgf/cm², the pressure may cause fracturing of the mold such as a mold made of graphite. Thus, such pressures are not preferable from the standpoint of efficiency of production.

In the sintering step as well, it is preferable that a graphite material having a high purity is used for molds made of graphite and for heat insulators for the heating furnace used in the process, from the viewpoint of high purity of the obtained sintered material. Therefore, it is preferable to use a graphite material which has been treated to have a high purity in advance. Specifically, it is preferable to use a graphite material which has been sufficiently baked at 2,500° C. or higher in advance, and thus generates no or few impurities at the temperature of sintering. The inert gas used in the process is preferably a gas of a high purity grade which contains few impurities.

In the present invention, the sintered silicon carbide having excellent properties can be obtained after the sintering step described above. However, a molding step may be conducted before the sintering step to provide the finally obtained sintered material with a higher density. The molding step is described hereinafter. The molding step comprises placing in a mold a raw material powder obtained by uniformly mixing the powder of silicon carbide and the carbon source; and heating at a temperature in the range of 80 to 300° C. for 5 to 60 minutes under pressure to prepare a molded material. In this procedure, it is preferable that the material powder is packed into the mold as densely as possible to provide the finally obtained sintered material with a higher density. In the molding step, a bulky powder can be made compact before the powder is packed for the hot pressing, and the production of a molded product having a high density or a large thickness can be facilitated by repeating the molding step.

A molded material made of the material powder is obtained by pressing the material powder at a temperature in the range of 80 to 300° C., preferably in the range of 120 to 140° C., at a pressure in the range of 60 to 100 kgf/cm² so that the density of the packed material powder becomes 1.5 g/cm³ or more, preferably 1.9 g/cm³ or more, followed by maintaining the material powder in the compressed condition for 5 to 60 minutes, preferably for 20 to 40 minutes. The smaller the average diameter of the particles is, the more difficult it is to provide the molded material with higher density. It is preferable that a suitable method, such as packing by vibration, is used to achieve a higher density when the powder material is placed into the mold. Specifically, when a powder has an average particle diameter of about 1 μm, the density is more preferably 1.8 g/cm³ or more, and when a powder has an average particle diameter of about 0.5 μm, the density is more preferably 1.5 g/cm³ or more. When the density is 1.8 g/cm³ or more in the former case, or 1.5 g/cm³ or more in the latter case, it is preferable to provide the finally obtained sintered material with a high density.

The molded material may be cut to a shape fitting a hot pressing mold in advance before being used in the sintering step. The molded material is subjected to the sintering step, in which the molded material is placed in a mold and hot pressed at a temperature of 2,000 to 2,400° C. at a pressure of 300 to 700 kgf/cm² in a nonoxidizing atmosphere as described above, to obtain a sintered silicon carbide having a high density and a high purity.

The sintered silicon carbide obtained above has a sufficient density, i.e., a density of 2.9 g/cm³ or more. A density of 2.9 g/cm³ or more leads to proper physical properties, such as bending strength and strength at break, and proper electric properties, without undesired contamination due to large particles. Therefore, such a density is not preferable. The density of the sintered silicon carbide is more preferably 3.0 g/cm³ or more.

When the obtained sintered material is porous, the sintered material has drawbacks in that heat resistance, oxidation resistance, chemical resistance and mechanical strengths are inferior; that cleaning is difficult; that tiny cracks are formed and tiny pieces of the material formed from the cracks become contaminating substances; that gases are permeable; and that application is limited as a result of these drawbacks.

The total content of impurities in the sintered silicon carbide according to the present invention is 5 ppm or less, preferably 3 ppm or less, more preferably 1 ppm or less. However, the content of impurities obtained by chemical analysis has importance merely as a reference from the standpoint of application to the field of parts of electronic devices and the semiconductor industry. When the sintered material is used actually in these fields, the results of evaluation also depend on the distribution of impurities, i.e., whether impurities are distributed uniformly or unevenly. For example, persons skilled in the art in the electronic industry generally evaluate the degree of contamination of wafers with impurities under prescribed heating conditions in accordance with various methods using apparatuses actually used in production. In accordance with the process described herein comprising carbonizing a solid material obtained by uniformly mixing a liquid silicon compound, a liquid organic compound which generates carbon in the presence of heat, and a catalyst for polymerization or crosslinking by heating in a nonoxidizing atmosphere and then baking the obtained product in a nonoxidizing atmosphere, the total content of impurity elements in the sintered material of silicon carbide can be reduced to 1 ppm or less. "Impurity elements" mean elements which belong to Group 1 to Group 16 of the Periodic Table in accordance with the revised edition of *Nomenclature in Inorganic Chemistry* by IUPAC, 1989, and have atomic numbers of 3 or more, excluding elements having atomic numbers of 6 to 8 and 14 to 16.

Examples of preferable physical properties of the sintered silicon carbide according to the present invention are as follows: bending strength of 50.0 to 65.0 kgf/mm$^2$ at room temperature and 55.0 to 80.0 kgf/mm$^2$ at 1500° C.; Young's modulus of $3.5 \times 10^4$ to $4.5 \times 10^4$; Vickers hardness of 2,000 kgf/mm$^2$ or more; Poisson's ratio of 0.14 to 0.21; thermal expansion coefficient of $3.8 \times 10^{-6}$ to $4.2 \times 10^{-6}$ (° C.$^{-1}$); heat conductivity of 150 W/m·k or more; specific heat of 0.15 to 0.18 cal/g·° C.; thermal shock resistance of 500 to 700 ΔT° C.; and volume resistivity of 1 Ω·cm or less.

The sintered material obtained according to the process is worked, polished and cleaned, depending on the application, and is then used for a sputtering target disk.

In the process for producing the sputtering target disk of the present invention, the apparatuses used for production are not particularly limited as long as the above heating conditions are satisfied, and conventional heating furnaces and reaction apparatuses can be used if consideration is given to the pressure resistance of molds used for sintering.

The powdered silicon carbide as the raw material powder of the present invention, and the silicon source and the carbon source used for producing the material powder, and the inert gas used for providing the nonoxidizing atmosphere each preferably has a content of impurity elements of 5 ppm or less. When the content of impurities is outside the above range, it is preferable that substances having a suitable content of impurities be selected as the raw materials in accordance with the desired purity of the obtained sintered silicon carbide to be obtained. "Impurity elements" mean elements which belong to Group 1 to Group 16 of the Periodic Table in accordance with the revised edition of *Nomenclature in Inorganic Chemistry* by IUPAC, 1989, and have atomic numbers of 3 or more, excluding elements having atomic numbers of 6 to 8 and 14.

EXAMPLES

The present invention will be described with reference to the following Examples. However, the present invention is not limited to the Examples.

Example 1

Preparation of Molded Material:

A commercial powder of β-type silicon carbide (Grade B-HP; manufactured by Stark Company; average particle diameter, 2 μm) in an amount of 1,410 g and a solution prepared by dissolving 90 g of a high purity liquid phenol resin of the resol type containing 20% of water in 2,000 g of ethanol were mixed sufficiently in a planetary ball mill for 18 hours. Then, the obtained mixture was heated to 50 to 60° C., and ethanol was evaporated to obtain a dry product. The product was sieved through a sieve of 500 μm to obtain a uniform powder of silicon carbide. 1,000 g of the resulting powder was packed into a mold and pressed at 130° C. for 20 minutes to obtain a molded material having a density of 2.2 g/cm$^3$.

Preparation of Sintered Material:

The molded material obtained above was placed in a mold made of graphite and hot pressed in accordance with the following conditions. As the apparatus for hot pressing, a 100 ton hot press of the high frequency induction heating type was used.

Conditions of the Sintering Step:

The temperature was raised from room temperature to 700° C. for 6 hours under a vacuum of 10$^{-5}$ to 10$^{-4}$ Torr and maintained at 700° C. for 5 hours (the first step of heating).

Then, in vacuo, the temperature was raised from 700° C. to 1,200° C. over 3 hours, from 1,200° C. to 1,500° C. over 3 hours, and maintained at 1,500° C. for 1 hour (the second step of heating).

The pressure was increased to 500 kgf/cm$^2$, and the temperature was raised from 1,500° C. to 2,200° C. for 3 hours and maintained at 2,200° C. for 1 hour in an argon atmosphere (the step of hot pressing).

Example 2

Preparation of High Purity Powder of Silicon Carbide:

6,800 g of a high purity oligomer of ethyl silicate (containing 40% of silica) was mixed with 3,050 g of a high purity liquid phenol resin of the resol type (containing 20% of water). To the mixture, 1,370 g of 28% aqueous solution of a high purity toluenesulfonic acid was added as the catalyst. The resulting mixture was hardened and dried to obtain a uniform resinous solid material. The resulting solid material was carbonized at 900° C. for 1 hour in a nonoxidizing atmosphere. The carbonized product had a C/Si ratio of 2.4 as measured by elemental analysis. 4,000 g of the carbonized product was placed in a vessel made of carbon, heated to 1,850° C. in an argon atmosphere, maintained at 1,850° C. for 10 minutes, then heated to 2,050° C., maintained at 2,050° C. for 5 minutes, and cooled to obtain a powder having an average particle diameter of 1.3 μm. The content of each impurity element was 0.5 ppm or less with respect to all impurities.

Preparation of Molded Material:

The high purity powder of silicon carbide prepared above in an amount of 1,410 g and a solution prepared by dissolving 90 g of a high purity liquid phenol resin of the resol type containing 20% of water in 2,000 g of ethanol were mixed sufficiently in a planetary ball mill for 18 hours. Then, the resulting mixture was heated at 50 to 60° C., and ethanol was evaporated to obtain a dry product. The product was sieved through a sieve of 500 μm to obtain a uniform powder of silicon carbide. 1,000 g of the resulting material powder was packed into a mold and pressed at 130° C. for 20 minutes to obtain a molded material having a density of 2.1 g/cm$^3$.

Preparation of Sintered Material:

The molded material obtained above was placed in a mold made of graphite and hot pressed under the following conditions. As the apparatus for hot pressing, a 100 ton hot press of the high frequency induction heating type was used.

Conditions of the Sintering Step:

The temperature was raised from room temperature to 700° C. over 6 hours under a vacuum of 10$^{-5}$ to 10$^{-4}$ Torr and maintained at 700° C. for 5 hours (the first step of heating).

Then, in vacuo, the temperature was raised from 700° C. to 1,200° C. over 3 hours, from 1,200° C. to 1,500° C. over 3 hours, and maintained at 1,500° C. for 1 hour (the second step of heating).

The pressure was increased to 500 kgf/cm$^2$, and the temperature was raised from 1,500° C. to 2,200° C. over 3 hours and maintained at 2,200° C. for 1 hour in an argon atmosphere (the step of hot pressing).

Comparative Example 1

Preparation of a Molded Material:

1,410 g of a commercial powder of β-type silicon carbide (Grade B-HP; manufactured by Stark Company; average particle diameter, 2 μm), 11 g of boron carbide ($B_4C$), and a solution prepared by dissolving 90 g of a high purity liquid phenol resin of the resol type (containing 20% of water) in 2,000 g of ethanol were mixed sufficiently in a planetary ball mill for 18 hours. Then, the resulting mixture was heated at 50 to 60° C., and ethanol was evaporated to obtain a dry product. The product was sieved through a sieve of 500 μm to obtain a uniform powder of silicon carbide. 1,000 g of the resulting material powder was packed into a mold and pressed at 130° C. for 20 minutes to obtain a molded material having a density of 2.2 g/cm³.

Preparation of Sintered Material:

The molded material prepared above was hot pressed under the same conditions as those in Example 1.

Conditions of the Sintering Step:

The first step of heating and the second step of heating were conducted successively under the same conditions as those in Example 1.

After the second step of heating, the pressure was increased to 150 kgf/cm², and the temperature was raised from 1,500° C. to 2,200° C. over 3 hours and maintained at 2,200° C. for 1 hour in an argon atmosphere (the step of hot pressing).

Comparative Example 2

Preparation of High Purity Powder of Silicon Carbide:

A high purity powder of silicon carbide was obtained in accordance with the same procedures as those in Example 2.

Preparation of Molded Material:

1,000 g of the material powder obtained above was packed into a mold and pressed at 130° C. for 20 minutes to obtain a molded material having a density of 1.9 g/cm³.

Preparation of Sintered Material:

The molded material prepared above was hot pressed under the same conditions as those in Example 2.

Conditions of the Sintering Step:

The first step of heating, the second step of heating, and the step of hot pressing were conducted successively under the same conditions as those in Example 2.

TABLE 1

Concentration of Impurities in Sintered Materials (ppm)

|    | Example 1 | Example 2 | Comparative Example 1 | Comparative Example 2 |
|----|-----------|-----------|----------------------|----------------------|
| B  | 0.8       | 0.00      | ≧1000                | 0.05                 |
| Al | 48        | 0.02      | 55                   | 0.03                 |
| Na | 3         | 0.03      | 10                   | 0.12                 |
| K  | 1.2       | 0.00      | 1.0                  | 0.06                 |
| Mg | 5         | 0.05      | 4                    | 0.04                 |
| Ti | 2         | 0.02      | 5                    | 0.06                 |
| Cr | 5         | 0.00      | 7                    | 0.04                 |
| Fe | 33        | 0.03      | 48                   | 0.08                 |
| Ni | 4         | 0.01      | 5                    | 0.04                 |

TABLE 1-continued

Concentration of Impurities in Sintered Materials (ppm)

|    | Example 1 | Example 2 | Comparative Example 1 | Comparative Example 2 |
|----|-----------|-----------|----------------------|----------------------|
| Co | 4         | 0.03      | 3                    | 0.01                 |
| W  | 1.2       | 0.00      | 1.0                  | 0.00                 |
| Cu | 0.5       | 0.00      | 0.8                  | 0.02                 |

To confirm the effects of the present invention, disks of silicon carbide having the size stated below were prepared from the sintered materials obtained in the Examples and Comparative Examples described above. The prepared disks were attached to packing plates, which matched a specific sputtering apparatus, by using indium as the adhesive so as to prepare sputtering target disks. Mechanical properties, electric properties, durability life in the operation of the sputtering apparatus, and the impurity level of a thin film which was formed in consideration of application to parts of electronic devices were evaluated in accordance with the following methods in order to examine the properties of the materials of the target disk.

The size of the sputtering target disk: diameter, 10 inches (250 mm φ); thickness, 5 mm.

Evaluation of Mechanical Properties and Electronic Properties:

For a material of a sputtering target disk before being attached to a packing plate, the density, the bending strength (at room temperature) and the volume resistivity were measured, and applicability to sputtering apparatuses of the direct current type and the high frequency type was examined.

Evaluation of Durability Life of Target Disk:

A sputtering disk comprised of the sintered material obtained above was attached to a sputtering apparatus of the high frequency type, and a thin film was prepared by using sintered materials of Examples 1 and 2, and Comparative Examples 1 and 2 by introducing argon gas under the following conditions.

Sputtering conditions: pressure of argon gas, 1 Pa; applied electric power, 1 KW.

The condition of wear of the target disk due to sputtering was periodically checked, and the durability life was determined from the period of time when the thickness of the most concave portion reached 2.5 mm (50% of the original thickness) due to uneven wear. The result of the material prepared in Example 1 was used as the reference (an index of 100), and other results were normalized with the reference. The larger the index, the more excellent the durability.

Evaluation of the Impurity Level of the Formed Thin Film:

A sputtering target disk prepared by using the sintered material obtained above was attached to a sputtering apparatus of the high frequency type, and then a thin film was formed. The number of iron atoms at the surface portion of the formed thin film was measured.

The results of the evaluations are shown in Table 2.

TABLE 2

|                                      | Example 1 | Example 2 | Comparative Example 1 | Comparative Example 2 |
|--------------------------------------|-----------|-----------|----------------------|----------------------|
| Density of sintered material (g/cm²) | 3.19      | 3.20      | 3.18                 | 2.12                 |

TABLE 2-continued

|  | Example 1 | Example 2 | Comparative Example 1 | Comparative Example 2 |
|---|---|---|---|---|
| Bending strength (room temp.) (MPa) | 510 | 500 | 540 | 220 |
| Volume resistivity ($\Omega$ cm) | $4.5 \times 10^{-2}$ | $2.8 \times 10^{-2}$ | $6.2 \times 10^{4}$ | $1.9 \times 10^{1}$ |
| Applicability to a sputtering apparatus |  |  |  |  |
| direct current type | good | good | poor | fair |
| high frequency type | good | good | good | good |
| Life before reaching 50% of the original thickness (index) | 100 | 126 | 82 | 46 |
| Number of iron atoms at the surface portion of a film (atoms/cm$^2$) | $2.3 \times 10^{14}$ | $7.8 \times 10^{10}$ | $4.7 \times 10^{15}$ | $5.9 \times 10^{10}$ |

The Examples and Comparative Examples show that the sputtering target disks made of silicon carbide which were prepared in accordance with the process of the present invention exhibited excellent mechanical and electric properties, and had a long durability life with respect to uneven wear. The thin films prepared by using the sputtering target disks of the present invention had purities which did not cause any problems in electronic devices. Thus, it was shown that the sputtering target disks of the present invention had excellent properties.

What is claimed is:

1. A sputtering target disk comprising a sintered silicon carbide;

wherein the sintered silicon carbide has a density of 2.9 g/cm$^3$ or more and is obtained by sintering a uniform mixture of a powder of silicon carbide and a nonmetallic auxiliary sintering agent;

wherein the nonmetallic auxiliary sintering agent is an organic compound which generates carbon in the presence of heat; and wherein a total amount of impurity elements contained in the sintered silicon carbide is 1 ppm or less.

2. A sputtering target disk according to claim 1, wherein the nonmetallic auxiliary sintering agent covers the surface of the powder of silicon carbide.

3. A sputtering target disk according to claim 1, wherein the sintered silicon carbide is obtained by hot pressing the mixture in an nonoxidizing atmosphere.

4. A sputtering target disk according to claim 2, wherein the sintered silicon carbide is obtained by hot pressing the mixture in an nonoxidizing atmosphere.

5. A sputtering target disk according to claim 1, wherein the powder of silicon carbide is obtained in accordance with a process comprising a solidifying step which comprises solidifying a mixture obtained by mixing a silicon source containing at least one liquid silicon compound, at least one liquid organic compound which generate carbon in the presence of heat, and a polymerization or crosslinking catalyst to obtain a solid material; and a sintering step which comprises carbonizing the solid material in a nonoxidizing atmosphere by heating, followed by sintering the carbonized material in a nonoxidizing atmosphere.

6. A sputtering target disk according to claim 2, wherein the powder of silicon carbide is obtained in accordance with a process comprising a solidifying step which comprises solidifying a mixture obtained by mixing a silicon source containing at least one liquid silicon compound, at least one liquid organic compound which generate carbon in the presence of heat, and a polymerization or crosslinking catalyst to obtain a solid material; and a sintering step which comprises carbonizing the solid material in a nonoxidizing atmosphere by heating, followed by sintering the carbonized material in a nonoxidizing atmosphere.

7. A sputtering target disk according to claim 3, wherein the powder of silicon carbide is obtained in accordance with a process comprising a solidifying step which comprises solidifying a mixture obtained by mixing a silicon source containing at least one liquid silicon compound, at least one liquid organic compound which generate carbon in the presence of heat, and a polymerization or crosslinking catalyst to obtain a solid material; and a sintering step which comprises carbonizing the solid material in a nonoxidizing atmosphere by heating, followed by sintering the carbonized material in a nonoxidizing atmosphere.

* * * * *